United States Patent
Yamaguchi

(10) Patent No.: US 6,876,467 B1
(45) Date of Patent: Apr. 5, 2005

(54) PRINTER WITH AUTOMATIC DENSITY ADJUSTING FUNCTION AND DENSITY ADJUSTING METHOD OF PRINTER

(75) Inventor: Yoshihiro Yamaguchi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 918 days.

(21) Appl. No.: 09/638,861

(22) Filed: Aug. 15, 2000

(30) Foreign Application Priority Data

Aug. 19, 1999 (JP) ............................................. 11-233147

(51) Int. Cl.[7] .............................................. G06F 15/00
(52) U.S. Cl. ..................... 358/1.9; 358/3.1; 358/502; 358/503; 358/505; 358/504; 358/518; 347/19; 347/172; 347/175; 347/176
(58) Field of Search ..................... 358/1.9, 3.1, 502, 358/503, 505, 504, 518; 347/19, 172, 175, 176

(56) References Cited

U.S. PATENT DOCUMENTS

| | | | |
|---|---|---|---|
| 5,222,721 A | * 6/1993 | Miura et al. ............. 270/58.19 |
| 6,168,325 B1 | * 1/2001 | Nagata ................... 400/120.01 |
| 6,226,022 B1 | * 5/2001 | Morishima et al. .......... 347/212 |
| 6,371,592 B1 | * 4/2002 | Otsuka et al. ................ 347/19 |
| 6,386,673 B1 | * 5/2002 | Takahashi et al. ............. 347/19 |
| 6,390,586 B1 | * 5/2002 | Takahashi et al. ............. 347/19 |
| 6,435,643 B1 | * 8/2002 | Miura et al. .................. 347/19 |

\* cited by examiner

*Primary Examiner*—Kimberly Williams
*Assistant Examiner*—Michael Burleson
(74) *Attorney, Agent, or Firm*—Sughrue Mion, PLLC

(57) ABSTRACT

When densities of C, M and Y colors for automatic density adjustment are measured, test patterns of R, G and B colors are printed on TA paper, and a fixing lamp throws lights that have bright line spectrums of R, G and B colors onto the test patterns and amounts of reflected lights of the test patterns of R, G and B colors are measured with a light-receiving sensor that is an HP sensor for determining a reference position of the TA paper. Then, the densities of C, M and Y colors are calculated according to the amounts of the reflected lights. The color production of the C, M and Y layers of the TA paper is adjusted so that the calculated densities of C, M and Y colors are target densities.

11 Claims, 13 Drawing Sheets

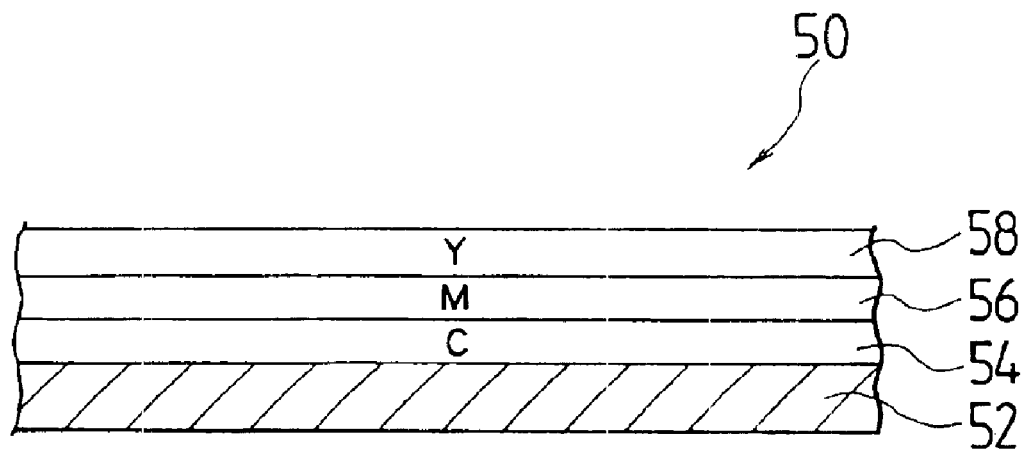
F I G. 2

F I G. 4
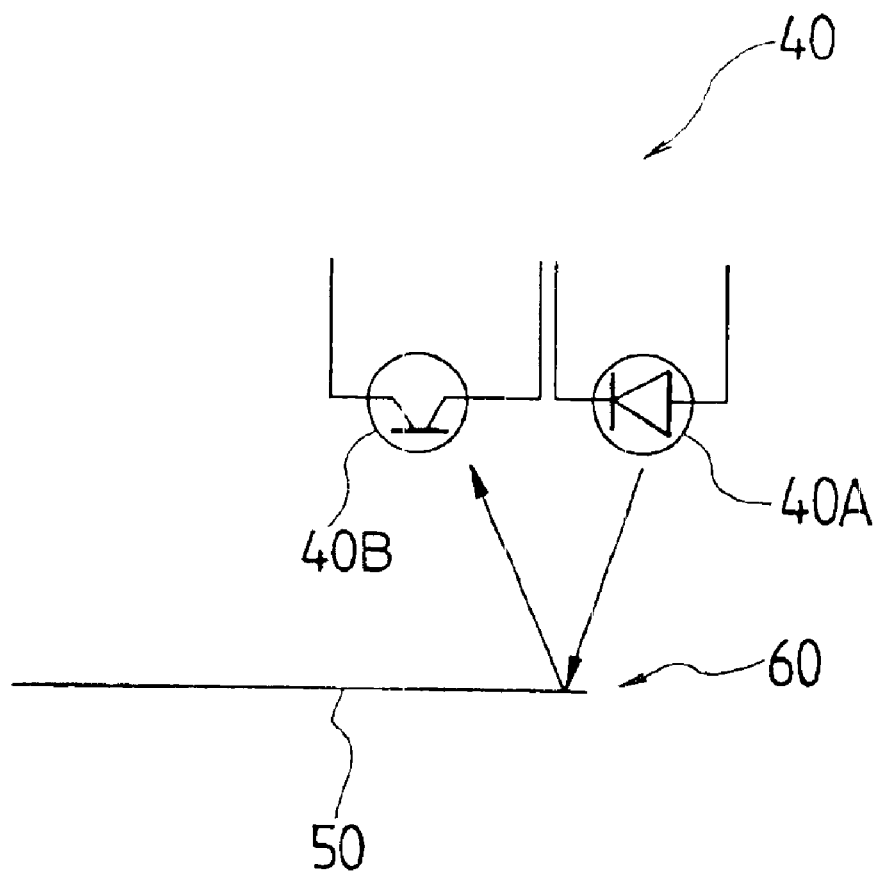

TEST PATTERNS FOR SENSITIVITY CORRECTION

F I G. 1 2
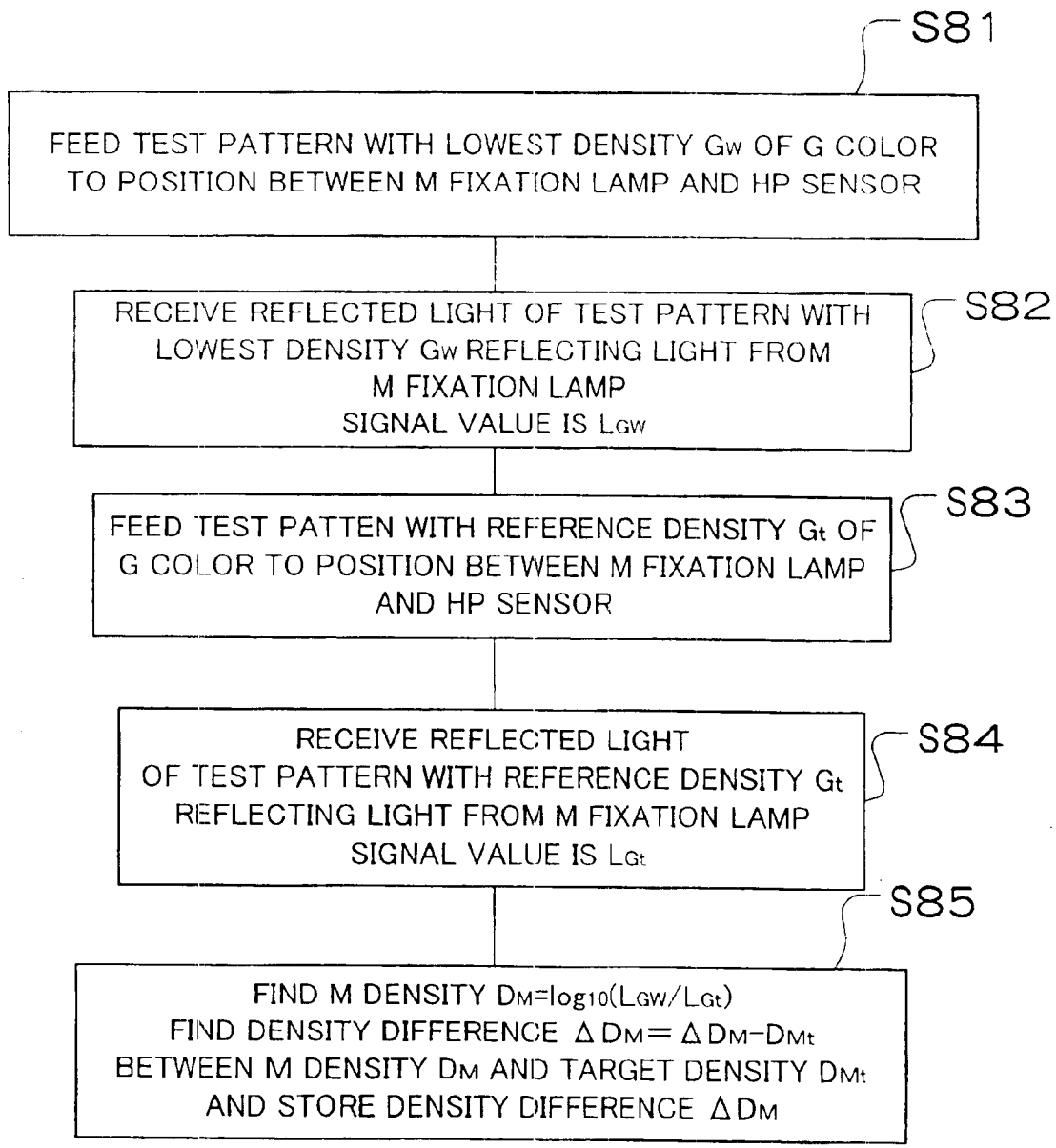

SPECTRAL REFLECTION FACTORS OF M COLOR

EMMISION SPECTRUM

SPECTRAL SENSITIVITY OF LIGHT-RECEIVING SENSOR

RECEPTION SPECTRUMS OF SENSOR

PRIOR ART

PRINTER WITH AUTOMATIC DENSITY ADJUSTING FUNCTION AND DENSITY ADJUSTING METHOD OF PRINTER

BACKGROUND OF THE INVENTION

1. Field of the Invention

This invention relates generally to a printer with an automatic density adjusting function and a density adjusting method of the printer. More particularly, this invention relates to a printer with an automatic density adjusting function that prints a color image on a color photographic paper that has a cyan (C) layer, a magenta (M) layer and an yellow (Y) layer by producing a color of each layer and a density adjusting method of the printer.

2. Description of Related Art

A printer that prints an image shot by a digital still camera or the like on photographic paper and operates on the thermo-autochrome (TA) method is on the market. In TA method, color photographic paper (TA paper) that has C, M and Y layers itself produces the colors when it is heated and the produced colors are fixed when a light of a predetermined wavelength is thrown onto the TA paper. TA method does not require ink or toner.

When an image of a color with the same density is printed on different TA papers in the printer operating in TA method, the densities (print densities) of the color of the images printed on the TA papers are different due to differences of characteristics of devices of the printer and the differences of the characteristics of the TA papers and the changes of them with the passing of time.

To prevent the differences of the densities, a method has been proposed, in which test patterns that are references for print density adjustment are printed and the print densities are measured and the difference between the print densities and reference densities are fed-back as correction values and the printer is adjusted to achieve the reference densities.

Also, a printer has been proposed, which uses fixation fluorescent lamps that is originally used for forming images and a light-receiving part of a home position sensor for determining the position of the paper and thus does not need a special densitometer (Japanese Patent Application No. 11-141500). The printer corrects the difference between the gray density and a reference density to correct an average density due to differences of sensitivities of the papers.

However, the C, M and Y layers of TA paper do not always have the same sensitivity characteristics. For example, the decline of the sensitivity due to drying of the C layer is larger than that of the Y layer. It is preferable to separately measure the densities of the three colors and separately correct the differences between the densities of the colors and reference densities.

For measuring the densities of C, M and Y colors with white being the reference, a plurality of light-receiving sensors that have spectral sensitivity characteristics only in R, G and B areas. But, if a plurality of light-receiving sensors with color separation filters is used, the cost is high. On the other hand, if the densities of test patterns of C, M and Y colors by one light-receiving sensor that has a broad spectral sensitivity for R, G and B colors, signal-to-noise ratios are low and the densities of C, M and Y colors can not be found even though the ratios of the light amounts of C, M and Y colors to that of white.

The case in which the density of M color in the G light area is measured with a light-receiving sensor that has a spectral sensitivity characteristics in wavelength areas of R, G and B colors will now be explained.

FIG. 14(A) shows spectral reflection factors of test patterns (solid line) of M color and white (dotted line). FIG. 14(B) shows an emission spectrum of a light source used for density measurement, and FIG. 14(C) shows spectral sensitivity characteristics of a light-receiving sensor used for the measurement of amounts of reflected lights. FIG. 14(D) shows reception spectrums of M color and white of the light-receiving sensor.

Originally, the density of M color is represented by the logarithm of the ratio of the light amounts in wavelength area of approximately 500 nm through 600 nm in FIG. 14(D). Spectrums of blue light with wavelength of approximately 400 nm through 500 nm and red light with wavelength of approximately 600 nm through 680 nm are unnecessarily received. As a result, the signal-to-noise ratios lower and the densities of C, M and Y colors can not be measured.

SUMMARY OF THE INVENTION

It is therefore an object of the present invention to provide a printer with an automatic density adjusting function that can precisely measure densities of C, M and Y colors with one light-receiving sensor and automatically adjust a density of each color due to characteristics of color photographic paper and the printer and the changes of them with the passing of time independently and a density adjusting method of the printer.

The above object can be accomplished by providing a printer with an automatic density adjusting function that prints a color image on a color photographic paper that has a cyan (C) layer, a magenta (M) layer and an yellow (Y) layer by producing a color of each layer, the printer comprising: a test pattern data producing device that produces test pattern data for printing test patterns of red (R), green (G) and blue (B) colors on the color photographic paper; a printing device that prints the test patterns of R, G and B colors on the color photographic paper according to the test pattern data; a light source that has bright line spectrums of R, G and B colors and throws lights onto the test patterns of R, G and B colors; a light-receiving sensor that has spectral sensitivity characteristics in wavelength areas of R, G and B colors and measures amounts of reflected lights of the test patterns of R, G and B colors; a density measuring device that measures densities of C, M and Y colors according to the amounts of the reflected lights of the test patterns of R, G and B colors that are acquired from the light-receiving sensor; and an adjusting device that adjusts color production of the C, M and Y layers of the color photographic paper so that the measured densities of C, M and Y colors are target densities.

The test patterns of R, G and B colors that are complementary to C, M and Y colors are printed for measuring the densities of C, M and Y colors. Spectral reflection factors from the test patterns of R, G and B colors have peaks only in wavelength areas of R, G and B colors, and thus only the amounts of the reflected light with the wavelength of each color of the test patterns of R, G and B colors even with a light-receiving sensor that has spectral sensitivity characteristics in the wavelength areas of R, G and B colors. Then, the densities of C, M and Y colors are measured according to the amounts of the reflected lights of the test patterns of R, G and B colors. After the measurement of the densities of C, M and Y colors, the color production of the C, M and Y layers of the color photographic paper is adjusted so that the measured densities of C, M and Y colors are the target densities.

Preferably, the test pattern data producing device produces test pattern data on six test patterns that are test patterns of R, G and B colors with lowest densities and test patterns-of R, G and B colors with reference densities; and the density measuring device finds a ratio of an amount of a reflected light of the test pattern of R color with the lowest density to that of the test pattern of R color with the reference density, a ratio of an amount of a reflected light of the test pattern of G color with the lowest density to that of the test pattern of G color with the reference density, and a ratio of an amount of a reflected light of the test pattern of B color with the lowest density to that of the test pattern of B color with the reference density according to amounts of reflected lights of the six test patterns that are acquired from the light-receiving sensor and finds the densities of C, M and Y colors according to the found ratios.

Preferably, the light source is an M fixation fluorescent lamp or a Y fixation fluorescent lamp that is composed from fluorescent materials emitting the bright line spectrums of R, G and B colors. Therefore, a light source for density measurement does not have to be added.

Preferably, the light-receiving sensor also works as a home position sensor that detects a home position of the color photographic paper. Therefore, a light-receiving sensor for density measurement does not have to be added.

The above object can be accomplished by providing a density adjusting method of a printer that prints a color image on a color photographic paper that has a cyan (C) layer, a magenta (M) layer and an yellow (Y) layer by producing a color of each layer, the density adjusting method comprising the steps of: printing test patterns of red (R), green (G) and blue (B) colors on the color photographic paper; sequentially throwing lights onto the test patterns of R, G and B colors with a light source that has bright line spectrums of R, G and B colors; sequentially measuring amounts of reflected lights of the test patterns of R, G and B colors with a light-receiving sensor that has spectral sensitivity characteristics in wavelength areas of R, G and B colors; calculating densities of C, M and Y colors according to the amounts of the reflected lights of the test patterns of R, G and B colors; and adjusting color production of the C, M and Y layers of the color photographic paper so that the calculated densities of C, M and Y colors are target densities.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a sectioned diagram showing the structure of TA paper used in the printer with the automatic density adjusting function according to the present invention;

FIG. 4 is a drawing showing the structure of a home position sensor;

FIG. 12 is a flow chart showing the procedure for finding a density correction amount of M color;

DETAILED DESCRIPTION OF THE PREFERRED EMBODIMENTS

This invention will be described in further detail by way of example with reference to the accompanying drawings.

Figure 1:
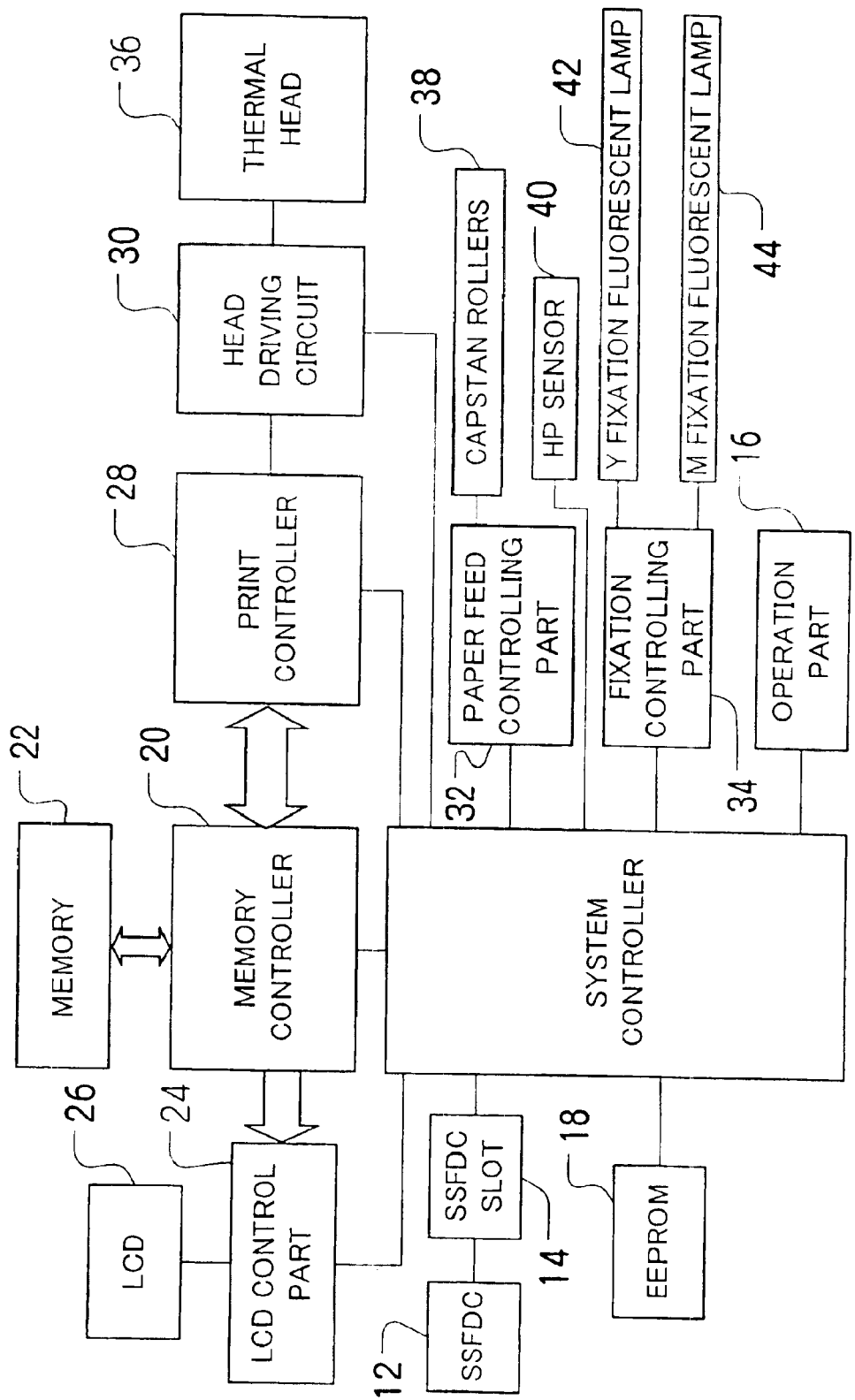
FIG. 1 is a block diagram showing an embodiment of a printer with an automatic density adjusting function according to the present invention.

FIG. 1 is a block diagram showing an embodiment of a printer with an automatic density adjusting function according to the present invention.

The printer operates on the thermo-autochrome (TA) method, and uses a TA paper that produces colors when it is heated and fixes the produced colors when a light of a predetermined wavelength is thrown onto the paper. The printer is provided with an SSFDC slot 14 in which a solid state floppy disc card (SSFDC (also called a Smart Media)) 12 that is a card-type IC memory is loaded, and an image recorded in the SSFDC 12 with a digital still camera or the like can be directly read from the printer without passing another device such as a personal computer to be printed on the TA paper.

The printer is also provided with a function for automatically adjusting density. This function prevents changes of print densities regardless of characteristics of TA papers or the like, and the density of the printed image on the TA paper is adjusted to a density that appropriately corresponds to gradation values (print gradation values) of the colors that are determined according to the image data when the image is intended to be printed.

The general printing processing by the TA-method-printer will now be explained, and the automatic adjusting of the printing density will be explained after that.

As shown in FIG. 1, a system controller 10 is a processing part that controls the whole system, and the system controller 10 gives various instructions of processing of image data, transmission and reception of image data to and from control blocks that will be explained later, printing and so on. Instructions of various instructions are given to the system controller 10 from an operation part 16 according to operation of a user, and an operation program for the system controller 10 is recorded in an EEPROM 18.

The SSFDC slot 14 in which the SSFDC 12 is loaded reads out image data of an image file recorded in the SSFDC 12, and inputs the image data to the system controller 10. The image data is read out according to an instruction of the system controller 10. The SSFDC 12 stores the image data that has been compressed in a predetermined format, and the system controller 10 expands the compressed image data that the system controller 10 has acquired the desired data by instructing the SSFDC slot 14 to read out the image data. Then, the system controller 10 performs a predetermined image processing on the image data and stores the image data in a memory 22 through a memory controller 20.

The memory controller 20 is a processing part that writes and reads data in and from the memory 22. The memory controller 20 stores the image data of a print image or the like that is read out from the SSFDC 12 in the memory 22, and outputs the image data of the print image or the like that is stored in the memory 22 according to the instruction of the system controller 10 to an LCD control part 24, a print controller 28 or the like.

The LCD control part 24 is a processing part that controls the display of a liquid crystal display (LCD) that is attached to the printer. After the system controller 10 instructs the LCD control part 24 to display an image, the LCD control part 24 acquires the image data of the image to be displayed and displays the image on an LCD 26. The LCD 26 displays a print image selecting picture (index picture) for selecting a print image, a print image that is being printed, and so on.

The print controller 28, a head driving circuit 30, a paper feed controlling part 32 and a fixation controlling part 34 are control blocks for printing, and the control blocks perform a variety of control while synchronizing with each other.

As shown in FIG. 2, the TA paper 50 used in the printer is composed in such a manner that a cyan (C) layer 54, a magenta (M) layer 56 and an yellow (Y) layer 58 are formed on a base 52 in that order. When the layers are given heat within ranges for the layers, the C layer 54, the M layer 56 and the Y layer 58 produces C color, M color and Y color, respectively, so that the color densities (gradations) of the colors correspond to the heat. When lights whose wavelengths are predetermined for the M layer 56 and the Y layer 58 (approximately 365 nm for the M layer 56 and approximately 425 nm for the Y layer 58) are thrown on the M layer 56 and the Y layer 58, the produced colors are fixed.

After the system controller 10 gives the print controller 28 an instruction for printing, the print controller 28 acquires the image data of the print image recorded in the memory 22 through the memory controller 20 and the gradations (printing gradation values) of C, M and Y colors at each pixel of the print image are set within ranges of 8 bit (0~255) according to the image data of the print image. Then, the data on the print gradation values of C, M and Y colors at pixels of the print image is outputted to the head driving circuit 30 on a line-byline basis that is perpendicular (main scanning direction) to the running direction (sub-scanning direction) of the TA paper in synchronization with the running of the TA paper.

After the head driving circuit 30 is given the data on the print gradation values of C, M and Y colors by the print controller 28 as described above, the head driving circuit 30 controls voltages that are applied to heating elements at dots of a thermal head 36 arranged along the main scanning direction and application times (pulse widths) according to the printing gradation values in synchronization with the running of the TA paper. Thus, the heat that is given to a point of the TA paper by the heating element at each dot of the thermal head 36 is controlled according to the printing gradation values of C, M and Y colors, and each layer of the TA paper generates a color whose density is corresponding to the printing gradation value instructed by the print controller 28.

After the paper feed controlling part 32 is given the instruction for printing by the system controller 10, the paper feed controlling part 32 feeds the TA paper from a TA paper storing part to a printing part. In the TA paper storing part, a paper cartridge on the market storing tens of sheets (for example, twenty sheets) of the TA paper is loaded. After feeding the TA paper to the printing part, the paper feed controlling part 32 drives capstan rollers 38 with a motor to run the TA paper in synchronization with printing processing of the color generation and fixation. At this time, the system controller 10 detects that the TA paper is at a home position with a home position (HP) sensor 40, and instructs the paper feed controlling part 32 to run the TA paper back and forth with the home position being the reference. The feed control of the TA paper will be explained later. The fixation controlling part 34 controls the turning on and off of a Y fixation fluorescent lamp 42 and an M fixation fluorescent lamp 44 in synchronization with the color generation processing of the Y layer and the M layer of the TA paper by the thermal head. The Y fixation fluorescent lamp 42 is a lamp that throws a light in which 425 nm is a peak wavelength, and the Y color is fixed when the Y fixation fluorescent lamp 42 is turned on and the lamp throws the light with the wavelength onto the TA paper. On the other hand, the M fixation fluorescent lamp 44 is a lamp that throws a light in which 365 nm is a peak wavelength, and the M color is fixed when the M fixation fluorescent lamp 44 is turned on and the lamp throws the light with the wavelength onto the TA paper.

Figure 3:
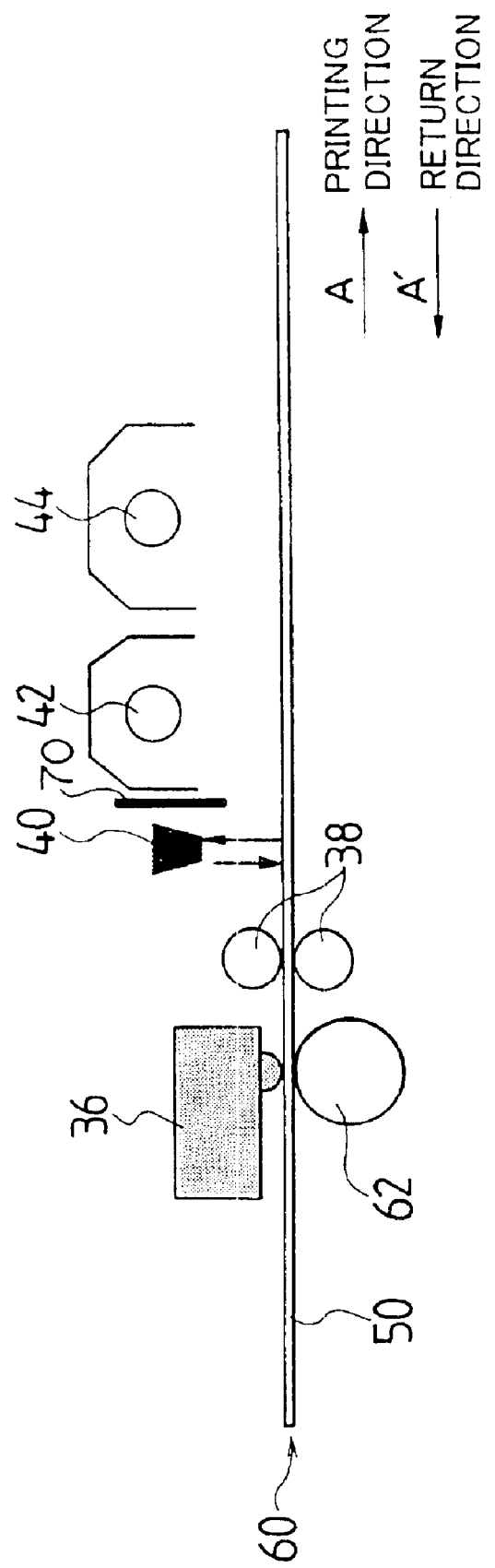
FIG. 3 is an arrangement drawing showing an embodiment of the printing part that performs the printing processing of the color generation and the fixation with respect to the TA paper in the printer with the automatic density adjusting function.

FIG. 3 is an arrangement drawing showing an embodiment of the printing part that performs the printing processing of the color generation and the fixation with respect to the TA paper in the printer with the automatic density adjusting function.

As shown in FIG. 3, in the printing part, the thermal head 36, the capstan rollers 38, the HP sensor 40, the Y fixation fluorescent lamp 42 and the M fixation fluorescent lamp 44 are arranged in that order from the upper stream of a feeding route along which the TA paper 50 is fed. The TA paper 50 fed from the upper stream of the feeding route is pinched by the thermal head 36 and a platen roller 62 and pinched by the capstan rollers 38. At the printing, the capstan rollers 38 are driven by the motor, and thus the TA paper 50 is run back and forth in the sub-scanning direction that is indicated by an arrow A and an arrow A'. In the thermal head 36, the multiple heating elements are arranged along the line in the main scanning direction that is perpendicular to the sub-scanning direction along which the TA paper 50 is fed, and predetermined heat is given to the TA paper 50 so that the color layers produce the colors by a line-by-line basis in synchronization with the feeding of the TA paper 50 in the printing direction indicated by the arrow A. The HP sensor 40 arranged downstream from the capstan rollers 38 is composed of an light emitting diode (LED) 40A and a light-receiving sensor 40B as shown in FIG. 4; and by emitting a light from the LED 40A onto the feeding route of the TA paper 50, the HP sensor 40 can detect the reflected light with the light-receiving sensor 40B. A detection signal outputted from the light-receiving sensor 40B is inputted to the system controller 10 in FIG. 1 through an A/D converter (not shown). The system controller 10 determines whether or not the TA paper 50 is at the HP sensor 40 by determining whether or not the light-receiving sensor 40B receives the reflected light of the light emitted from the LED 40A. The system controller 10 determines that the front end of the TA paper 50 has arrived at the HP sensor 40 after the HP sensor 40 has detected the TA paper 50. The TA paper 50 is aligned when the front end of the TA paper 50 has arrived at the HP sensor 40 as the home position, and the feeding of the TA paper 50 and the printing of the color generation and the fixation are performed in synchronization with each other with the home position being the reference.

Figure 5:
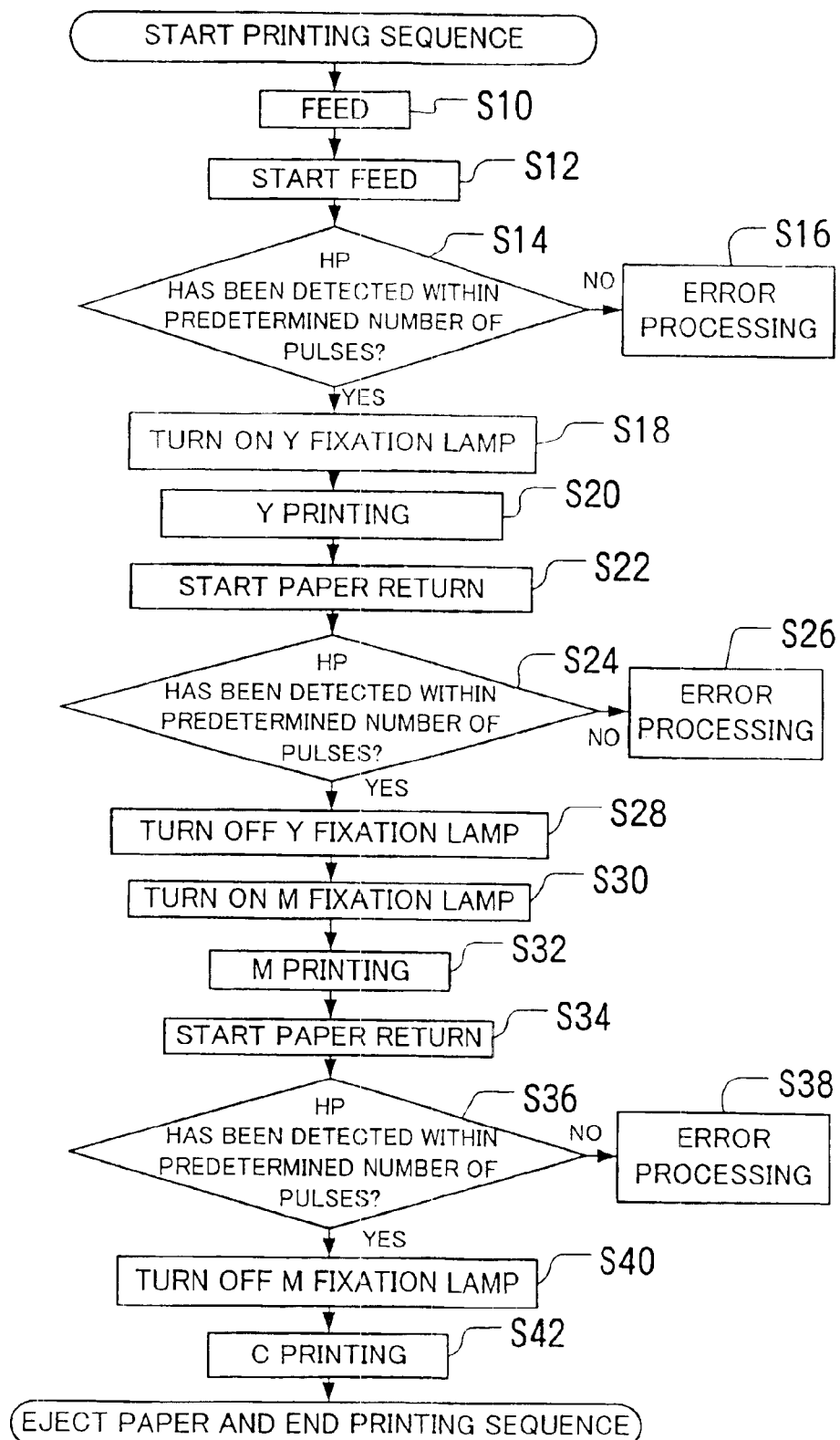
FIG. 5 is a flow chart showing the outline of the procedure in which a desired print image is printed on the TA paper in the printer with the automatic density adjusting function.

The outline of the procedure in which a desired print image is printed on the TA paper 50 in the printer with the automatic density adjusting function will now be explained with reference to the flow chart in FIG. 5. First, after the system controller 10 in FIG. 1 is given the instruction for printing by the operation part 16, the system controller 10 starts the printing sequence and instructs the paper feed controlling part 32 to feed the TA paper 50 from the paper storing part to the printing part in FIG. 3 (step 10). Then, the paper feed controlling part 32 feeds the TA paper 50 at a constant speed in the printing direction indicated by the arrow A in FIG. 3 from a predetermined time (feeding start) (step 12). After the start of the feeding at the constant speed, the system controller 10 counts the number of pulses of synchronous signals that are synchronous with the feeding of the TA paper 50, and determines whether or not the front end of the TA paper 50 has been detected by the HP sensor within the predetermined number of the pulses (step 14). If NO, then the system controller 10 determines that an error has been made, for example the TA paper 50 is not loaded in the paper storing part and the paper has been stuck; and performs an error processing such as stopping of the printing (step 16).

If YES, then the system controller 10 turns on the Y fixation fluorescent lamp 42 with the fixation controlling part 34 in FIG. 1 (step 18), and the light whose wavelength is approximately 425 nm is thrown onto the TA paper 50 that has been fed to the Y fixation fluorescent lamp 42 through the thermal head 36.

The system controller 10 instructs the print controller 28 to perform Y color printing and control the heat that the heating element of each dot of the thermal head 36 gives to the TA paper 50 according to the Y color printing gradation values of the image data of the print image. Then, the system controller 10 gives the print controller 28 and the head driving circuit 30 the synchronous signals that are synchronous with the feeding of the TA paper 50 with the time when the TA paper 50 passes the home position being the reference. Thus, when the TA paper 50 passes the thermal head, the thermal head 36 gives heat with low energy to the upper layer (Y layer) at points of the TA paper 50 to generate Y color at the points. The heat that the thermal head 36 gives to the points of the TA paper 50 is adjusted according to the densities of the Y color to be generated, and the densities of Y color are set by the print controller 28 in FIG. 1 according to the Y color printing gradation values of the image data of the print image.

The TA paper 50 that has passed the thermal head 36 and generated Y color is then fed to the position where the Y fixation fluorescent lamp 42 throws the fixing light, and Y color is fixed at the position. The Y color printing processing of the TA paper 50 is finished (step 20).

After the Y color printing processing, the system controller 10 instructs the paper feed controlling part 32 to feed the TA paper 50 in the return direction indicated by the arrow A' in FIG. 3 (paper return start) (step 22), and the system controller 10 determines whether or not the front end of the TA paper 50 has been detected by the HP sensor within the predetermined number of the pulses in the same way as at step 14 (step 24). If NO, then the system controller 10 performs an error processing such as stopping of the printing (step 26).

If YES, then the TA paper 50 is stopped at the home position and fed at the constant speed in the printing direction indicated by the arrow A in FIG. 3 in the same way as at step 12. Then, the system controller 10 turns off the Y fixation fluorescent lamp 42 with the fixation controlling part 34 in FIG. 1, and turns on the M fixation fluorescent lamp 44 (step 30), and the light is thrown on o the TA paper 50 that has been fed to the M fixation fluorescent lamp 44 through the thermal head 36.

The system controller 10 instructs the print controller 28 to perform M color printing and control the heat that the heating element of each dot of the thermal head 36 gives to the TA paper 50 according to the M color printing gradation values of the image data of the print image in the same way as in the Y color printing. Then, the system controller 10 gives the print controller 28 and the head driving circuit 30 the synchronous signals that are synchronous with the feeding of the TA paper 50 with the time when the TA paper 50 starts to be fed from the home position being the reference. Thus, the thermal head 36 gives heat with intermediate energy to the middle layer (M layer) at points of the TA paper 50 to generate M color at the points.

The TA paper 50 that has passed the thermal head 36 and generated M color is then fed to the position where the M fixation fluorescent lamp 44 throws the fixing light, and M color is fixed at the position. The M color printing processing of the TA paper 50 is finished (step 32).

After the M color printing processing, the system controller 10 instructs the paper feed controlling part 32 to feed the TA paper 50 in the return direction indicated by the arrow A' in FIG. 3 (paper return start) (step 34), and the system controller 10 determines whether or not the front end of the TA paper 50 has been detected by the HP sensor 40 within the predetermined number of the pulses (step 36). If NO, then the system controller 10 performs an error processing such as stopping of the printing (step 38).

If YES, then the TA paper 50 is stopped at the home position and fed at the constant speed in the printing direction indicated by the arrow A in FIG. 3 in the same way as at step 12. Then, the system controller 10 turns off the M fixation fluorescent lamp 42 (step 40).

The system controller 10 instructs the print controller 28 to perform C color printing and control the heat that the heating element of each dot of the thermal head 36 gives to the TA paper 50 according to the C color printing gradation values of the image data of the print image in the same way as in the Y color printing and the M color printing. Then, the system controller 10 gives the print controller 28 and the head driving circuit 30 the synchronous signals that are synchronous with the feeding of the TA paper 50 with the time when the TA paper 50 starts to be fed from the home position being the reference. Thus, the thermal head 36 gives heat with high energy to the lower layer (C layer) at points of the TA paper 50 to generate C color at the points (step 42). The heat that the thermal head 36 gives to the points of the TA paper 50 is adjusted according to the densities of the C color to be generated in the same way as in the Y color printing and the M color printing, and the densities of C color are set according to the C color printing gradation values of the image data of the print image.

C, M and Y color printings are performed in the above-described way, and the TA paper on which the predetermined print image has been printed is ejected from the printer and the printing processing is finished.

The density adjusting method in the printer will now be explained.

First, to measure the densities of C, M and Y colors, test patterns of R, G and B colors that are complementary to C, M and Y colors are printed on the TA paper.

Figure 6:
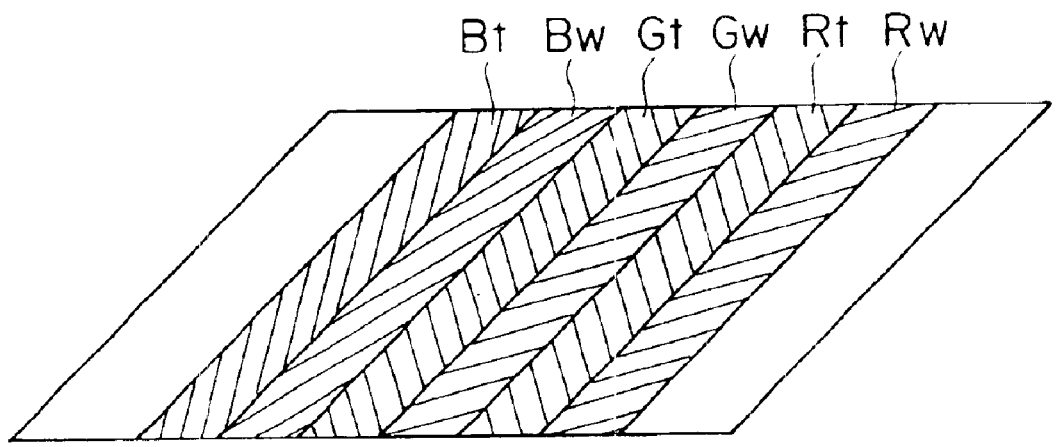
FIG. 6 is a drawing showing the TA paper on which test patterns are printed.

The test patterns of R, G and B colors have six densities that are lowest densities $R_w$, $G_w$ and $B_w$ of R, G and B colors and reference densities $R_t$, $G_t$, and $B_t$ of R, G and B colors as shown in FIG. 6.

In case of the printing in subtractive mixture of C, M and Y color gradations that are within 256 gradations (8 bit); gradations for realizing the lowest densities $R_w$, $G_w$ and $B_w$ of R, G and B colors are as follows, $R_w$: C=0, M=255, Y=255;
$G_w$: C=255, M=0, Y=255;
$B_w$: C=255, M=255, Y=0.

Gradations for realizing the reference densities $R_t$, $G_t$ and $B_t$ of R, G and B colors are defined, for example, as follows, $R_t$: C=128, M=255, Y=255;
$G_t$: C=255, M=128, Y=255;
$B_w$: C=255, M=255, Y=128.

Then, amounts of the reflected lights of the six test patterns are measured, and the densities of C, M and Y colors are found according to the measurement results.

G color will now be explained as an example. M density $D_M$ of the reference density $G_t$ with respect to the lowest density $G_w$ is found by the equation 1, when the amounts of the reflected lights of the lowest density $G_w$ and the reference density $G_t$ are $L_{Gw}$ and $L_{Gt}$, respectively, $$D_M = -\log_{10}(L_{Gt}/L_{Gw}) \quad \text{equation 1.}$$

A target density $D_{Mt}$ of the reference density $G_t$ is set in advance and stored as a fixed value, and a density correction amount $\Delta D_M$ is represented by the equation 2, $$\Delta D_M = D_M - D_{Mt} \quad \text{equation 2.}$$

Figure 7:
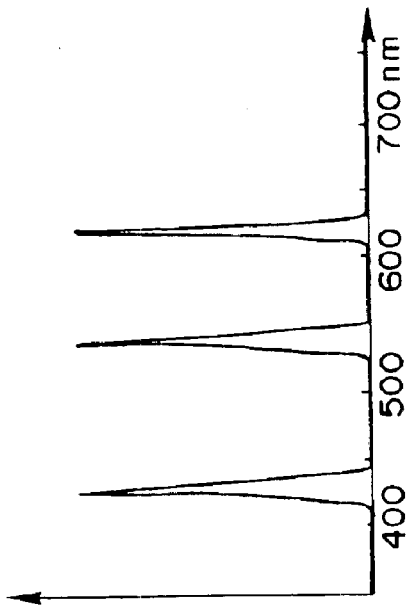
FIG. 7(A) shows spectral reflection factors of test patterns of G color.
FIG. 7(B) shows an emission spectrum of the light source.
FIG. 7(C) shows spectral sensitivity characteristics of a light-receiving sensor.
FIG. 7(D) shows reception spectrums of the light-receiving sensor.
Figure 7:
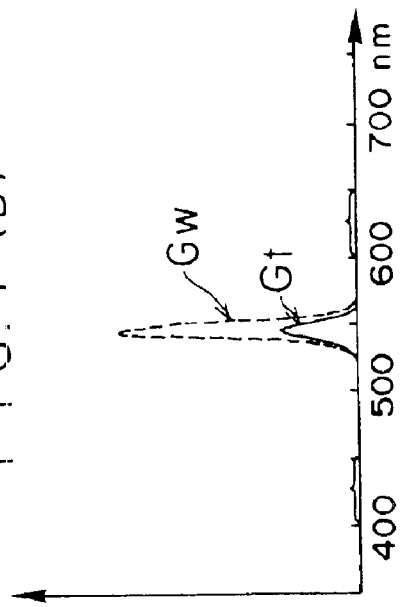
Figure 7:
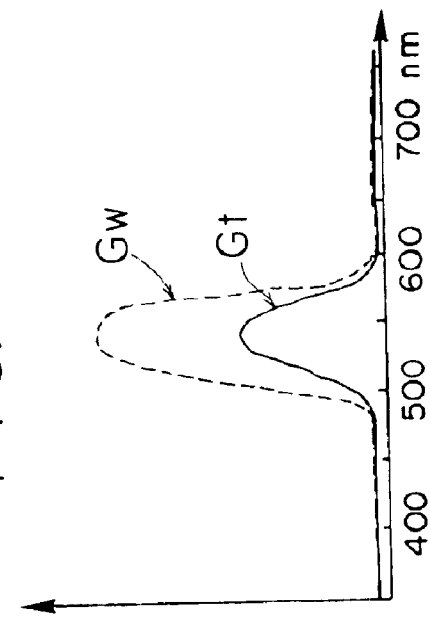
Figure 7:
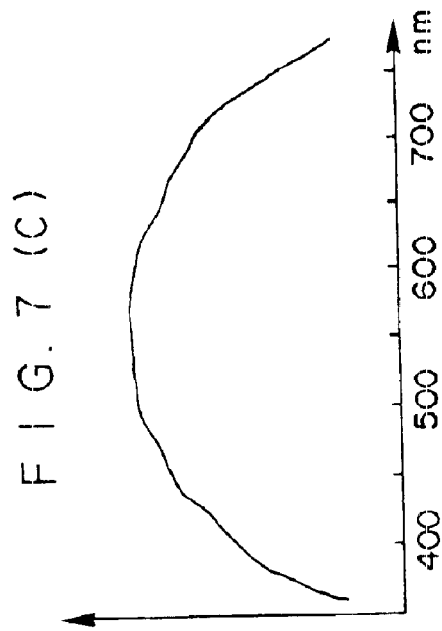

FIG. 7(A) shows spectral reflection factors of the lowest density $G_w$ and the reference density $G_t$. FIG. 7(B) shows an emission spectrum of the light source used for the density measurement, and FIG. 7(C) shows spectral sensitivity characteristics of the light-receiving sensor used for the measurement of the amounts of the reflected lights. FIG. 7(D) shows reception spectrums of the lowest density $G_w$ and the reference density $G_t$ in the light-receiving sensor.

Even though the light-receiving sensor has the broad spectral sensitivity (see FIG. 7(C)), the amounts of the reflected lights of only the lowest density $G_w$ and the reference density $G_t$ can be measured as shown in FIG. 7(D) and the density correction amount $\Delta D_M$ and so on can be precisely found. Density correction amounts for C and Y colors are found in the same way.

The density correction amounts for C, M and Y colors show sensitivity characteristics of C, M and Y colors of the TA paper on which the test patterns are printed (and characteristics of the thermal head 36 and the like). When an ordinary print image is printed, a control amount that affects the print densities are corrected in the way that will be described later so that the density correction amounts are 0, and thus the print densities are corrected.

Figure 8:
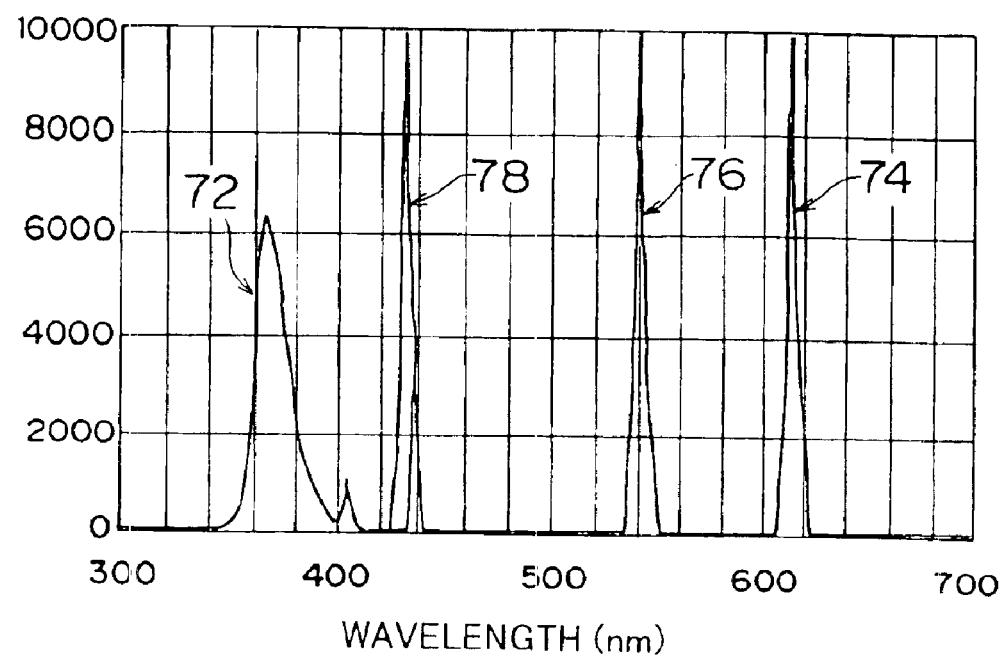
FIG. 8 is a bright line spectrum of an M fixation fluorescent lamp that can be used as the light source.
Figure 9:
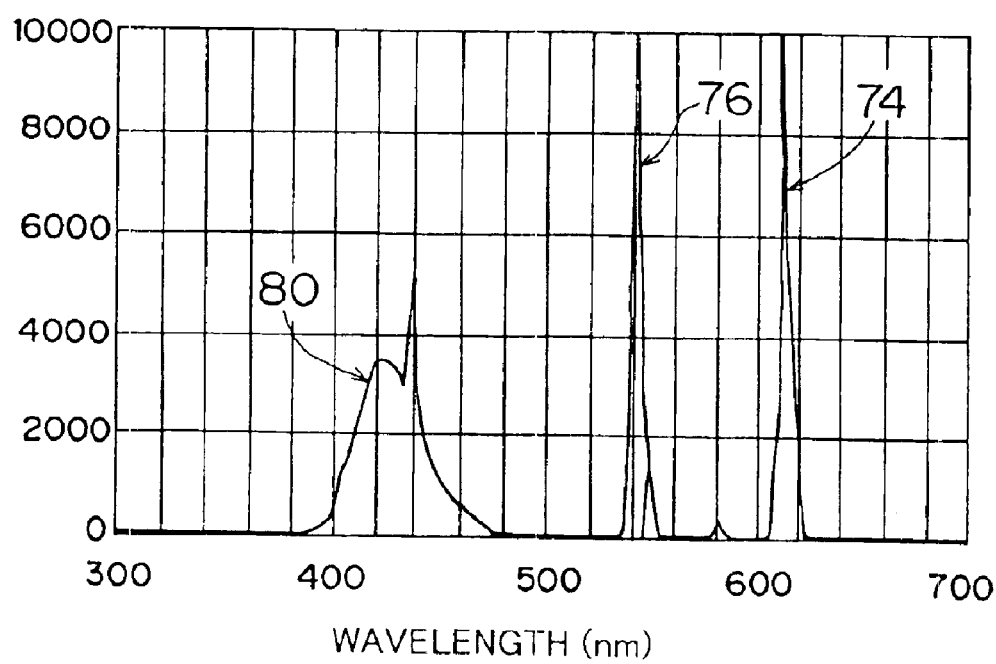
FIG. 9 is a bright line spectrum of a Y fixation fluorescent lamp that can be used as the light source.
Figure 10:
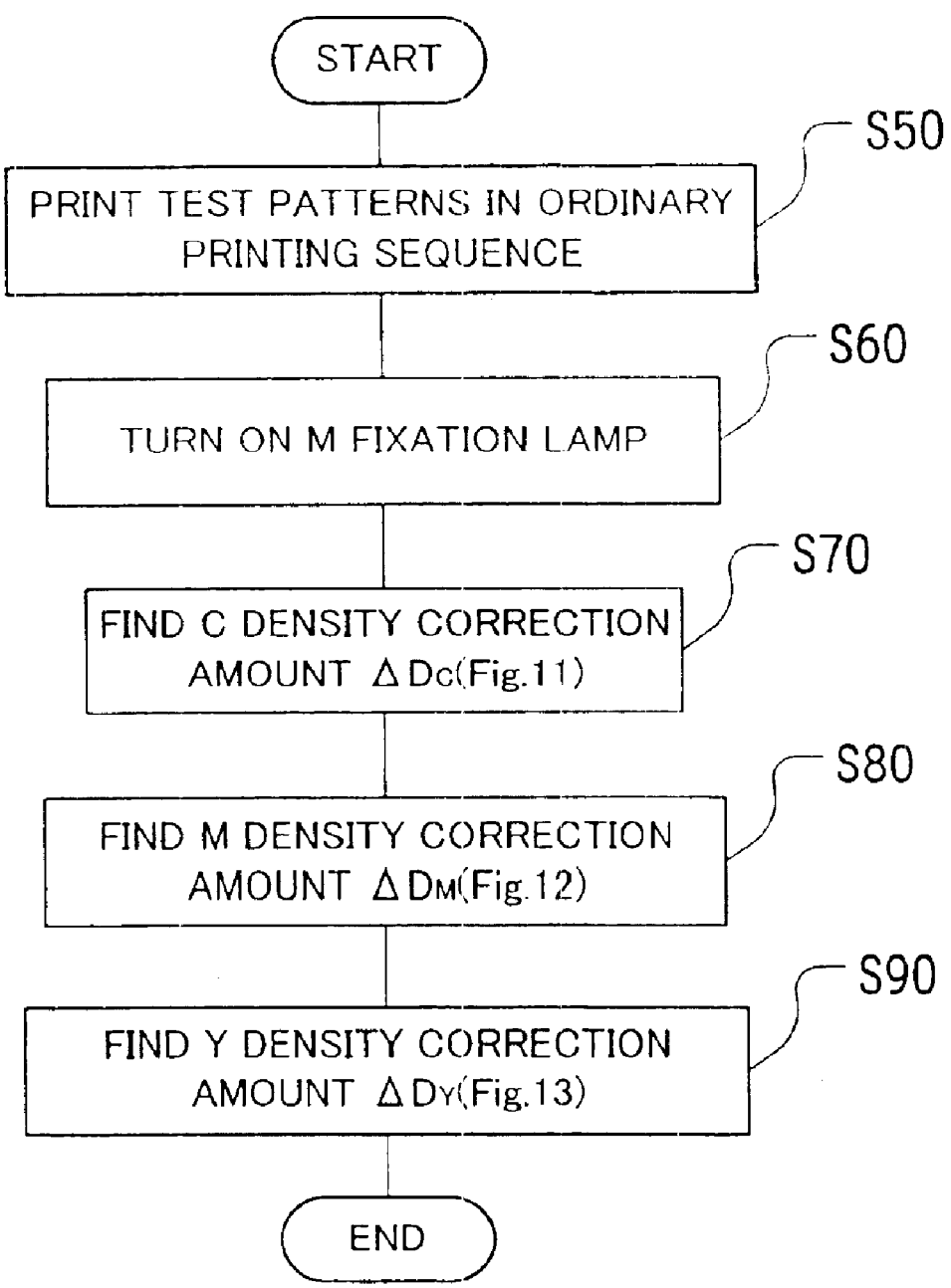
FIG. 10 is a flow chart showing the procedure for finding density correction amounts due to sensitivity characteristics of the TA paper.

The light source used for the density measurement only needs to have bright line spectrums of, and it may be a white light. As shown in FIG. 8, if a fluorescent material for emitting lights with three wavelengths for R, G and B colors is added to the M fixation fluorescent lamp 44 whose peak wavelength 72 is 365 nm and the mixture ratio is adjusted, bright line spectrums 74, 76 and 78 of R, G and B wavelength areas are added to the wavelength area for fixing M color, and thus the M fixation fluorescent lamp 44 can also be used as the light source used for the density measurement. Likewise, as shown in FIG. 9, if the Y fixation fluorescent lamp 42 whose peak wavelength 80 is 425 nm changed in the same way as the M fixation fluorescent lamp 44, the Y fixation fluorescent lamp 42 can also be used as the light source used for the density measurement. The M fixation fluorescent lamp 44 that does not have intense lights in the blue area is better as the light source for equalizing the R, G and B light amounts.

The light-receiving sensor 40B of the HP sensor 40 can be used as the light-receiving sensor for measuring the amounts of the reflected lights of the test patterns.

If the M fixation fluorescent lamp 44 and the light-receiving sensor 40B of the HP sensor 40 are used as the light source for the density measurement and the light-receiving sensor, respectively, a measure is taken so that the light-receiving sensor 40B does not receive lights other than the reflected light of the TA paper 50 reflecting the light emitted from the M fixation fluorescent lamp 44. For example, as shown in FIG. 3, a light-shielding plate 70 that prevents the light emitted from the M fixation fluorescent lamp 44 from directly entering the light-receiving sensor 40B of the HP sensor 40 is arranged between the M fixation fluorescent lamp 44 and the HP sensor 40. In case the light emitted from the M fixation fluorescent lamp 44 does not directly enter the light-receiving sensor 40B of the HP sensor 40 even if the light-shielding plate 70 is not provided, the light-shielding plate 70 does not have to be provided.

The system controller 10 instructs the paper feed controlling part 32 to control the position of the TA paper in order to position the test patterns printed for the density measurement on the TA paper at a position between the HP sensor 40 and the M fixation fluorescent lamp 44 that has bright line spectrums of R, G and B colors. Then, the system controller 10 turns on the M fixation fluorescent lamp 44, and throws the light from the M fixation fluorescent lamp 44 onto the test patterns, and measures the amounts of the reflected lights with the light-receiving sensor 40B of the HP sensor 40.

After the amounts of the reflected lights of the six test patterns printed on the TA paper are measured by the light-receiving sensor 40B, the system controller 10 founds the densities of C, M and Y colors according to the measured amounts of the reflected lights (see equation 1) and then founds the density correction amounts of C, M and Y colors (see equation 2).

The procedure for finding the density correction amounts due to the sensitivity characteristics of the TA paper will now be explained with reference to flow charts in FIGS. 10, 11, 12 and 13.

After a predetermined operation button of the operation part 16 in FIG. 1 is operated to start the sensitivity correction, the system controller 10 prints the six test patterns on the TA paper in an ordinary printing sequence according to test pattern data stored in the memory 22 (step 50). After the printing of the test patterns, the printer enters the density measuring sequence instead of ejecting the TA paper.

When the printer enters the density measuring sequence, the system controller 10 turns on the M fixation fluorescent lamp 44 (step 60). After the illumination of the lamp is stabilized, the system controller 10 finds the C density correction amount $\Delta D_C$, the M density correction amount $\Delta D_M$ and the Y density correction amount $\Delta D_Y$ in that order (steps 70, 80 and 90).

Figure 11:
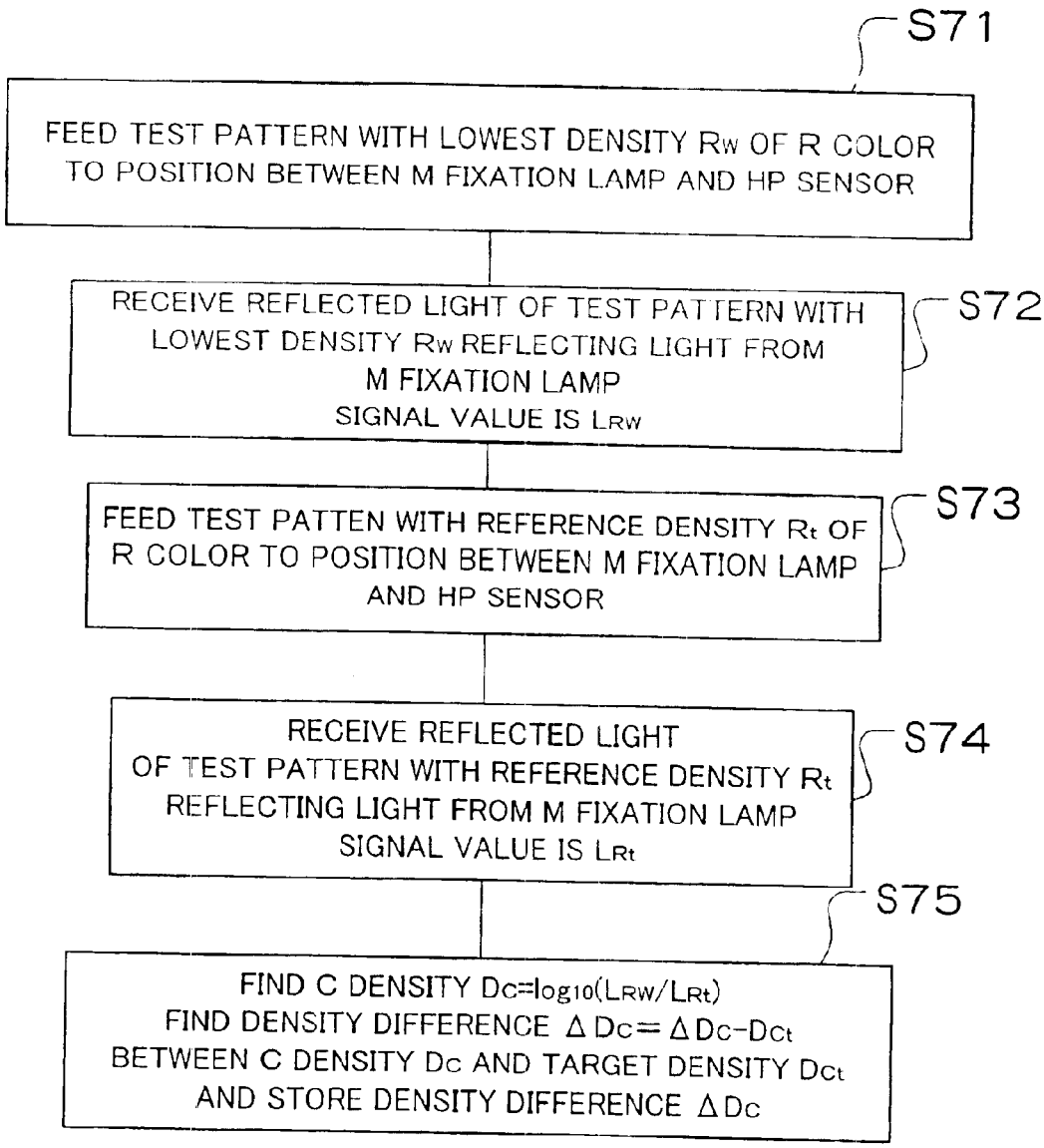
FIG. 11 is a flow chart showing the procedure for finding a density correction amount of C color.

When the system controller 10 finds the C density correction amount $\Delta D_C$, as shown in FIG. 11, the part of the TA paper on which the test pattern with the lowest density $R_w$ of R color is printed is fed to the position between the M fixation fluorescent lamp 44 and the HP sensor 40 (step 71). Then, the reflected light of the test pattern with the lowest density $R_w$ reflecting the light from the M fixation fluorescent lamp 44 is received by the HP sensor, and the signal value is $L_{Rw}$ (step 72).

Then, the part of the TA paper on which the test pattern with the reference density $R_t$ of R color is printed is fed to the position between the M fixation fluorescent lamp 44 and the HP sensor 40 (step 73). Then, the reflected light of the test pattern with the reference density $R_t$ reflecting the light from the M fixation fluorescent lamp 44 is received by the HP sensor, and the signal value is $L_{Rt}$ (step 74).

The C color density $D_C$ is found from the signal values $L_{Rw}$ and $L_{Rt}$ by the equation 1, and the density difference (the density correction amount of C color) $\Delta D_C$ between the C color density $D_C$ and the target density $D_{Ct}$ of the reference density $R_t$ is found, and the density difference $\Delta D_C$ is stored (step 75).

Figure 13:
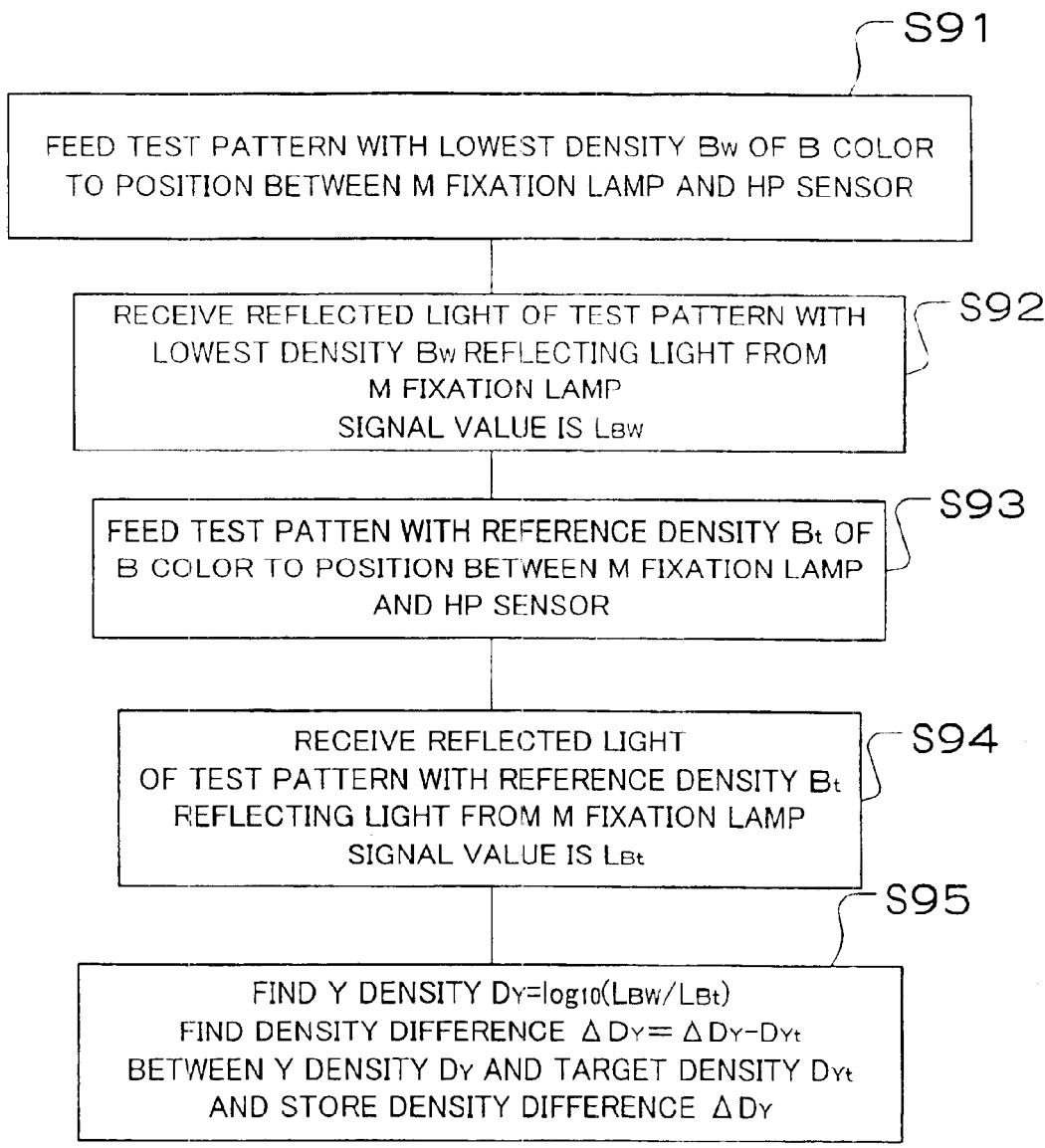
FIG. 13 is a flow chart showing the procedure for finding a density correction amount of Y color.
Figure 14A:
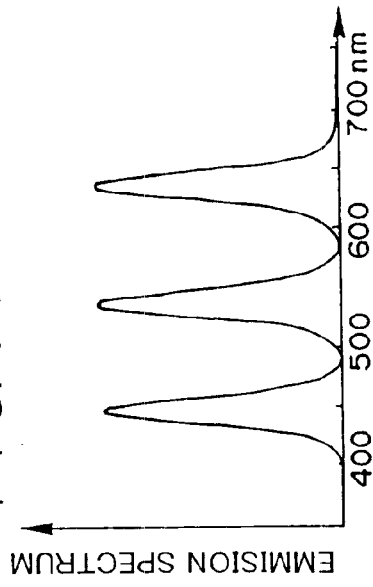
FIG. 14(A) shows spectral reflection factors of test patterns of M color.
Figure 14B:
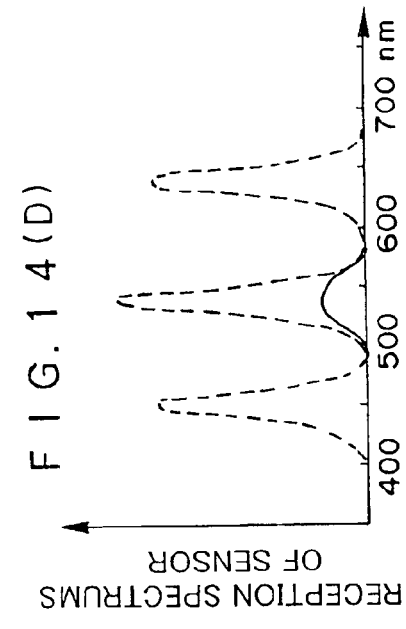
FIG. 14(B) shows an emission spectrum of the light source.
Figure 14C:
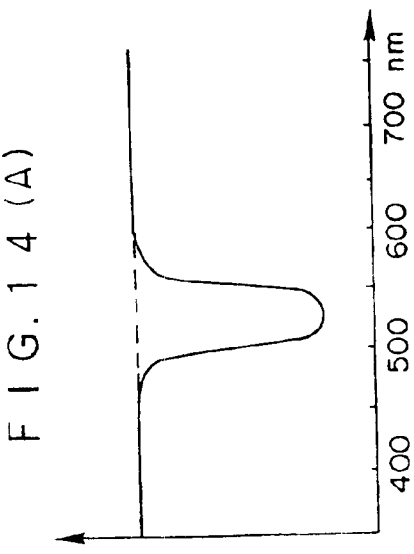
FIG. 14(C) shows spectral sensitivity characteristics of a light-receiving sensor.
Figure 14D:
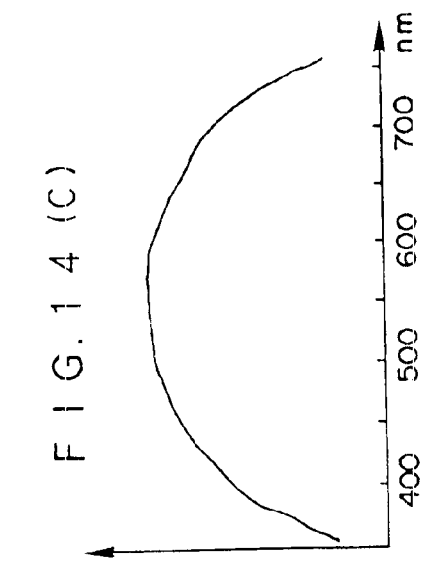
FIG. 14(D) shows reception spectrums of the light-receiving sensor.

Likewise, when the system controller 10 finds the M density correction amount $\Delta D_M$, the processing of steps 81–85 in FIG. 12 is performed; and when the system controller 10 finds the Y density correction amount $\Delta D_Y$, the processing of steps 91–95 in FIG. 13 is performed. The processing of steps 81–85 in FIG. 12 and the processing of steps 91–95 in FIG. 13 are the same as the processing of steps 71–75 in FIG. 11, and thus they will not be explained in detail.

The density correction amounts of C, M and Y colors related to the sensitivity characteristics of the TA paper and so on are found and stored, and then the LCD 26 in FIG. 1 or the like display a message that the printer is ready for the ordinary printing, and the printer waits for the next instruction for printing to be inputted.

After the instruction for printing is inputted, the applied energy applied to each dot of the thermal head 36 is controlled according to the printing gradation values of C, M and Y colors of the image data of the print image and corrected according to the stored density correction amounts C, M and Y colors, and thus the color generating of the C, M and Y layers is adjusted. Therefore, the C, M and Y layers can generate the desired colors regardless of the sensitivity characteristics of the TA paper and so on.

The applied energy is corrected according to the applied voltage, the application time, the printing gradation values or the combination of two or three of them.

A correction table showing the relationship between the density correction amount and the correction amount for the parameter such as the applied voltage is prepared in the printer in advance by an experiment, and the correction amount for the parameter is read according to the measured density correction amount, and the applied energy is corrected according to the correction amount. The relationship between the density correction amount and the correction amount for the parameter may be represented by a numerical formula, and the correction amount for the parameter may be calculated.

According to the embodiment, the density of each color due to the sensitivity of the TA paper can be corrected, and the present invention can be applied to a machine adjusting processing while the printer is produced. Especially, by the sequence in which the printing is started again after the density correction, the automatic convergence is possible and the manual work can be reduced.

As set forth hereinabove, the test patterns of R, G and B colors that are complementary to C, M and Y colors are printed for measuring the densities of C, M and Y colors, and the amounts of the reflected lights of the test patterns of R, G and B colors are measured by the light-receiving sensor. Thus, the one light-receiving sensor that has the spectral sensitivity characteristics in the wavelength areas of R, G and B colors can measure only the amounts of the reflected light with the wavelength of each color of the test patterns of R, G and B colors. Therefore, the densities of C, M and Y colors can be precisely measured by the one light-receiving sensor, and the density of each color due to the characteristics of the color photographic paper and the printer and the changes of them with the passing of time can be independently adjusted.

The home position sensor that detects the home position of the color photographic paper can be used as the light-receiving sensor, and the M fixation fluorescent lamp or the Y fixation fluorescent lamp that is composed from the fluorescent materials emitting the bright line spectrums of R, G and B colors can be used as the light source. Thus, the light-receiving sensor for measuring the densities and the light source do not need to be added, and therefore the printer is inexpensive.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A printer with an automatic density adjusting function that prints a color image on a color photographic paper that has a cyan (C) layer, a magenta (M) layer and an yellow (Y) layer by producing a color of each layer, said printer comprising:

a test pattern data producing device that produces test pattern data for printing test patterns of red (R), green (G) and blue (B) colors on said color photographic paper;

a printing device that prints the test patterns of R, G and B colors on said color photographic paper according to the test pattern data;

a light source that has bright line spectrums of R, G and B colors and throws lights onto the test patterns of R, G and B colors;

a light-receiving sensor that has spectral sensitivity characteristics in wavelength areas of R, G and B colors and measures amounts of reflected lights of the test patterns of R, G and B colors;

a density measuring device that measures densities of C, M and Y colors according to the amounts of the reflected lights of the test patterns of R, G and B colors that are acquired from said light-receiving sensor; and an adjusting device that adjusts color production of the C, M and Y layers of said color photographic paper so that the measured densities of C, M and Y colors are target densities.

2. The printer with the automatic density adjusting function as defined in claim 1, wherein said light-receiving sensor also works as a home position sensor that detects a home position of the color photographic paper.

3. The printer of claim 1, wherein the R, G, B colors comprise individually formed color patches.

4. The printer of claim 1, wherein the color patches include formation of low density color patches formed of only two colors of C, M and Y which are formed at maximum density.

5. The printer with the automatic density adjusting function as defined in claim 1, wherein said light source is one of an M fixation fluorescent lamp and a Y fixation fluorescent lamp that is composed from fluorescent materials emitting the bright line spectrums of R, G and B colors.

6. The printer with the automatic density adjusting function as defined in claim 5, wherein said light-receiving sensor also works as a home position sensor that detects a home position of the color photographic paper.

7. The printer with the automatic density adjusting function as defined in claim 1, wherein:

said test pattern data producing device produces test pattern data on six test patterns that are test patterns of R, G and B colors with lowest densities and test patterns of R, G and B colors with reference densities; and said density measuring device finds a ratio of an amount of a reflected light of the test pattern of R color with the lowest density to that of the test pattern of R color with the reference density, a ratio of an amount of a reflected light of the test pattern of G color with the lowest density to that of the test pattern of G color with the reference density, and a ratio of an amount of a reflected light of the test pattern of B color with the lowest density to that of the test pattern of B color with the reference density according to amounts of reflected lights of the six test patterns that are acquired from said light-receiving sensor and finds the densities of C, M and Y colors according to the found ratios.

8. The printer with the automatic density adjusting function as defined in claim 7, wherein the said light-receiving sensor also works as a home position sensor that detects a home position of the color photographic paper.

9. The printer with the automatic density adjusting function as defined in claim 7, wherein said light source is one of an M fixation fluorescent lamp and a Y fixation fluorescent lamp that is composed from fluorescent materials emitting the bright line spectrums of R, G and B colors.

10. The printer with the automatic density adjusting function as defined in claim 9, wherein said light-receiving sensor also works as a home position sensor that detects a home position of the color photographic paper.

11. A density adjusting method of a printer that prints a color image on a color photographic paper that has a cyan (C) layer, a magenta (M) layer and an yellow (Y) layer by producing a color of each layer, said density adjusting method comprising the steps of:

printing test patterns of red (R), green (G) and blue (B) colors on said color photographic paper;

sequentially throwing lights onto the test patterns of R, G and B colors with a light source that has bright line spectrums of R, G and B colors;

sequentially measuring amounts of reflected lights of the test patterns of R, G and B colors with a light-receiving sensor that has spectral sensitivity characteristics in wavelength areas of R, G and B colors;

calculating densities of C, M and Y colors according to the amounts of the reflected lights of the test patterns R, G and B colors; and adjusting color production of the C, M and Y layers of said color photographic paper so that the calculated densities of C, M and Y colors are target densities.

* * * * *